United States Patent [19]

Shishido et al.

[11] Patent Number: 5,060,061
[45] Date of Patent: Oct. 22, 1991

[54] METHOD OF READING AN IMAGE RECORDED IN A PHOTOGRAPHIC FILM TONE CHARACTERISTIC CORRECTING METHOD IN REPRODUCING AN IMAGE RECORDED IN A PHOTOGRAPHIC FILM

[75] Inventors: Ichiro Shishido; Tadayoshi Miyoshi; Takashi Kuriyama, all of Yokohama; Hiromitsu Kurokawa, Yokosuka; Shigeaki Tada, Hiratsuka; Hiroshi Nishiyama, Ninomiya, all of Japan

[73] Assignee: Victor Company of Japan, Ltd., Yokohama, Japan

[21] Appl. No.: 545,420

[22] Filed: Jun. 27, 1990

[30] Foreign Application Priority Data

Jun. 30, 1989 [JP] Japan ................................. 1-170763
Aug. 8, 1989 [JP] Japan ................................. 1-205248

[51] Int. Cl.$^5$ ............................ G03F 3/08; H04N 3/36
[52] U.S. Cl. ........................................ 358/80; 358/214; 358/76
[58] Field of Search ............... 358/214, 43, 44, 49, 358/54, 29, 76, 80

[56] References Cited

U.S. PATENT DOCUMENTS

| | | | |
|---|---|---|---|
| 3,634,611 | 1/1972 | Pugsley | 358/80 |
| 3,879,750 | 4/1975 | Seckel et al. | 358/76 |
| 3,893,166 | 7/1975 | Pugsley | 358/80 |
| 4,096,523 | 6/1978 | Balmares-Sarabia et al. | 358/80 |
| 4,402,015 | 7/1983 | Yamada | 358/80 |
| 4,467,364 | 8/1984 | Konagaya | 358/80 |
| 4,829,371 | 5/1989 | Hiramatsu et al. | 358/80 |

Primary Examiner—James J. Groody
Assistant Examiner—Glenton B. Burgess
Attorney, Agent, or Firm—Koppel & Jacobs

[57] ABSTRACT

A frame of photographic film is optoelectronically scanned after development to produce an electronic image which is analayzed to determine the exposure and development conditions of the film. Tone conversion signals are generated in accordance with the analyzed conditions to convert the tone characteristics of the electronic image to optimal values and thereby compensate for non-standard exposure and development. The electronic image of the entire frame, or alternatively only a part of the electronic image corresponding to an unexposed area of the frame, may be used to determine the development conditions.

10 Claims, 7 Drawing Sheets

METHOD OF READING AN IMAGE RECORDED IN A PHOTOGRAPHIC FILM TONE CHARACTERISTIC CORRECTING METHOD IN REPRODUCING AN IMAGE RECORDED IN A PHOTOGRAPHIC FILM

BACKGROUND OF THE INVENTION

The present invention relates to a method of reading an image recorded in a photographic film to generate an image signal.

A method of photoelectrically converting an image recorded in a monochromatic or color photographic film by use of a CCD line image sensor, for example, to thereby generate a image signal has been proposed in various forms. An image stored in a film and to which this kind of image reading method is applicable is not always picked up or developed under adequate conditions. Specifically, images representative of the same object would have different tones and color reproducibility if they were exposed and/or developed under different conditions. A prerequisite is, therefore, that even an image of a film exposed and/or developed under inadequate conditions be reproduced in tones and color reproducibility comparable with those of an image picked up and developed under adequate conditions. To meet this requirement, various procedures for reading an image of a photographic film has been reported in the past.

For example, Japanese Patent Laid-Open Publication (Kokai) No. 63-202738 discloses a method which prescans an image recorded in a color photographic film and whose exposing condition selected at the time of shooting are not known. The prescanning generates image signals each being representative of a particular color. The exposing conditions of the image are estimated on the basis of the individual image signals and tone characteristic data particular to the film. Further, a tone conversion characteristic is selected which matches the estimated exposing conditions and the tone characteristic data particular to the film. The image prescanned as mentioned above is scanned again to produce individual color signals. These signals resulted from the scanning, as distinguished from the prescanning, and the tone conversion characteristic are used to correct the tone characteristics of the individual color components of the image, whereby corrected image signals are generated. More specifically, these image signals are used to reproduce a color image in adequate tones and colors. Such a procedure allows even an image of a color photographic film picked up under inadequate exposing conditions to be reproduced in tones as faithful as those of an image picked up under adequate conditons. However, the problem is that this prior art method cannot always reproduce tones which are visually favorable, depending on the pattern of the color image. Japanese Patent Laid-Open Publication (Kokai) No. 61-238174 teaches a similar method which is capable of generating image signals having optimal tones with no regard to the exposing conditions.

None of the above-mentioned prior art methods gives consideration to the developing conditions, although they read an image by taking account of the exposing conditions which are not known. Specifically, the tone characteristic data particular to a film and stored in a memory beforehand, i.e., a relation between the amount of exposure and the film density is derived from only the standard, or adequate, developing conditions. Usually, the tone characteristic of a film varies with the developing time, developing temperature and other developing conditions. Hence, when an image developed under non-standard, or inadequate, developing conditions is to be read, determining the tone conversion characteristic by using the stored tone characteristic data would prevent the resulting image signal from having a satisfactory gray balance. A current trend in the art of photography is toward a broader range of developing conditions, i.e., films which may be developed under a broader range of conditions. Therefore, there is an increasing demand for an image reading method capable of coping with such various kinds of films.

SUMMARY OF THE INVENTION

It is therefore an object of the present invention to provide a method of reading an image of a photographic film to generate an image signal which is capable of reproducing even an image exposed and/or developed under inadequate conditions in tones as faithful as with an image picked up under particular adequate conditions.

It is another object of the present invention to provide an image reading method for a photographic film which generates an image signal capable of reproducing an image the tones of which are visually favorable.

It is yet another object of the present invention to provide an image reading method for a photographic film which generates an image signal capable of reproducing even an image developed under inadequate developing conditions with improved gray balance.

It is a further object of the present invention to provide a generally improved method of reading an image recorded in a photographic film.

In accordance with the present invention, a method of reading an image recorded in a photographic film to generate an image signal representative of the image comprises the steps of prescanning the image of the film to generate a first image signal, reading tone characteristic data stored beforehand and associated with the film, estimating exposing conditions of the film selected at the time of shooting on the basis of the first image signal and tone characteristic data, determining a first tone conversion characteristic from the estimated exposure conditions and tone characteristic data, scanning the image of the film to generate a second image signal, correcting a tone characteristic of the second image signal by the first tone conversion characteristic, determining a frequency distribution of a luminance component of the corrected second image signal, determining a second tone conversion characteristic by changing the first tone conversion characteristic such that the determined frequency distribution becomes a predetermined flat distribution, and further correcting by said second tone conversion characteristic the corrected tone characteristic of the second image signal.

Also, in accordance with the present invention, a method of reading an image recorded in a photographic film to generate an image signal representative of the image comprises the steps of prescanning the film to generate a non-exposure signal associated with a non-exposed area of the film, determining a density of the non-exposed area of the film in response to the non-exposure signal, storing beforehand tone characteristic groups each being associated with a particular kind of film and including a plurality of developing conditions, inputting a kind of the film, selecting one of the tone characteristic groups which is associated with the inputted kind of the film, estimating developing conditions on the basis of the determined density, selecting a particular tone characteristic out of the selected tone characteristic group which is associated with the estimated developing conditions, and reading the image which is an exposed area of the film to generate an exposure signal and then correcting a tone characteristic of the exposure signal by the tone characteristic selected in step (g) to thereby generate the image signal.

Further, in accordance with the present invention, a method of reading an image recorded in a photographic film to generate an image signal representative of the image comprises the steps of prescanning the film to generate a non-exposure signal associated with a non-exposed area of the film, determining a density of the non-exposed area of the film in response to the non-exposure signal, storing beforehand a tone characteristic including standard developing conditions of a plurality of kinds of films and a density of non-exposed portions of the plurality of kinds of films, inputting a kind of the film, reading standard developing conditions matching the inputted kind and a density of a non-exposed area of the film, determining a difference between the dinsity of the non-exposed area associated with the standard developing conditions and the determined density of said non-exposed area of the film, shifting the tone characteristic associated with the standard developing conditions by the determined difference, and reading the image of the film which is an exposed area to generate an exposure signal and then correcting the tone characteristic by the shifted tone characteristic and thereby generating the image signal.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

To better understand the present invention, a brief reference will be made to a prior art apparatus for reading a photographic film as disclosed in, for example, Japanese Patent Laid-Open Publication (Kokai) No. 63-202738 or Japanese Patent Laid-Open Publication (Kokai) No. 61-238174.

Figure 1:
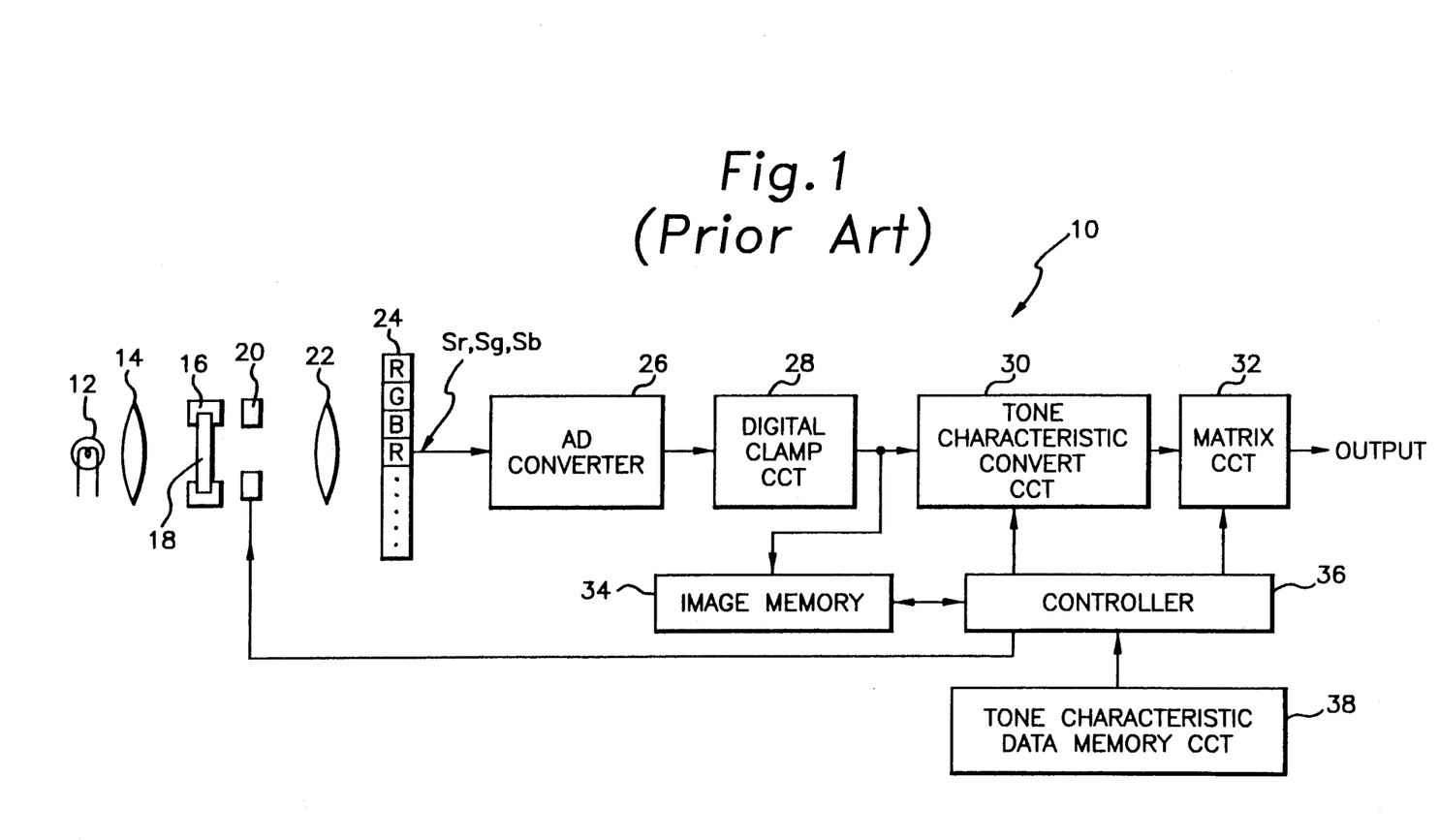
FIG. 1 is a block diagram schematically showing an apparatus for practicing a prior art method of reading an image recorded in a photographic film.

As shown in FIG. 1, the image reading apparatus, generally 10, has a light source 12, a lens 14, a holder 16 for holding a color photographic film 18, a stop 20, a focusing lens 22, and a CCD (Charge Coupled Device) line image sensor or similar photoelectric converting device 24. The apparatus 10 further has an analog-to-digital (AD) converter 26, a digital clamping circuit 28, a tone characteristic converting circuit 30, a matrix circuit 32, an image memory 34, a controller 36 implemented as a CPU (Central Processing Unit), for example, and a tone characteristic data memory circuit 38. The memory circuit 38 is loaded with tone characteristic data particular to a film, i.e., a relation between the amount of exposure and the film density beforehand.

In operation, light issuing from the light source 12 is incident to the film 18 retained by the holder 16 via the lens 14. The light transmitted through the film 18 is propagated through the stop 20 to the focusing lens 22 and thereby focused onto the CCD line image sensor 24. While effecting main scanning by itself, the line image sensor 24 is sequentially moved in the subscanning direction to generate three primary color signals Sr, Sg and Sb representative of the color image of the film 18. The color signals Sr, Sg and Sb are transformed into digital image signals by the AD converter 26 and then applied to the digital clamping circuit 28. After the digital image signals have their black level set by the clamping circuit 28, they are fed to the tone characteristic converting circuit 30 and image memory 34.

Specifically, the apparatus 10 first prescans the film 18 whose exposing conditions are not known. The digital image signals Sr, Sg and Sb produced by such prescanning and associated with the color image of the film 18 are written to the image memory 34. The controller 36 estimates the exposing conditions of the film 18 by using the digital image signals Sr, Sg and Sb written to the image memory 34 and the tone characteristic data stored in the tone characteristic data memory circuit 38 beforehand. Based on the estimated exposing conditions and the tone characteristic data associated therewith, the controller 36 determines tone conversion characteristics and color correction characteristics which should be applied to the individual color signals Sr, Sg and Sb. The tone conversion characteristics and the color correction characteristics are set in the tone characteristic converting circuit 30 and the matrix circuit 32, respectively. Further, the controller 36 controls the stop 20 to a particular aperture value matching the estimated exposing conditions.

Subsequently, the apparatus 10 scans the exposure film 18 again. Three primary color signals Sr, Sg and Sb resulted from this scanning, as distinguished from the prescanning, are also routed through the AD converter 26 and digital clamping circuit 28 to the tone characteristic converting circuit 30. In response, the converting circuit 30 corrects the tone characteristics of the individual color signals Sr, Sg and Sb on the basis of the tone conversion characteristics having been set therein. Then, the matrix circuit 32 corrects the colors by using the color correction characteristics having been loaded therein as stated earlier. As a result, the matrix circuit 32 outputs color signals which are capable of reproducing the color image in adequate tones and colors.

As stated above, even when an image recorded in a color photographic film and read by the prior art method as described above has inadequate exposing conditions as selected at the time of shooting, the method automatically produces color image signals which are as faithful as with an image of a color film picked up under adequate exposing conditions. However, the tones reproduced by the prior art method are not always visually preferable, depending on the pattern of the color image, as stated previously. Further, the prior art method does not give consideration to developing conditions such as developing time and developing temperature, so that the gray balance attainable with the image signal is limited. The above-stated scheme, therefore, cannot satisfactorily cope with all the films having been developed under a broad range of conditions.

Preferred embodiments of the image reading method in accordance with the present invention will be described with reference to the accompanying drawings.

FIRST EMBODIMENT

Figure 2:
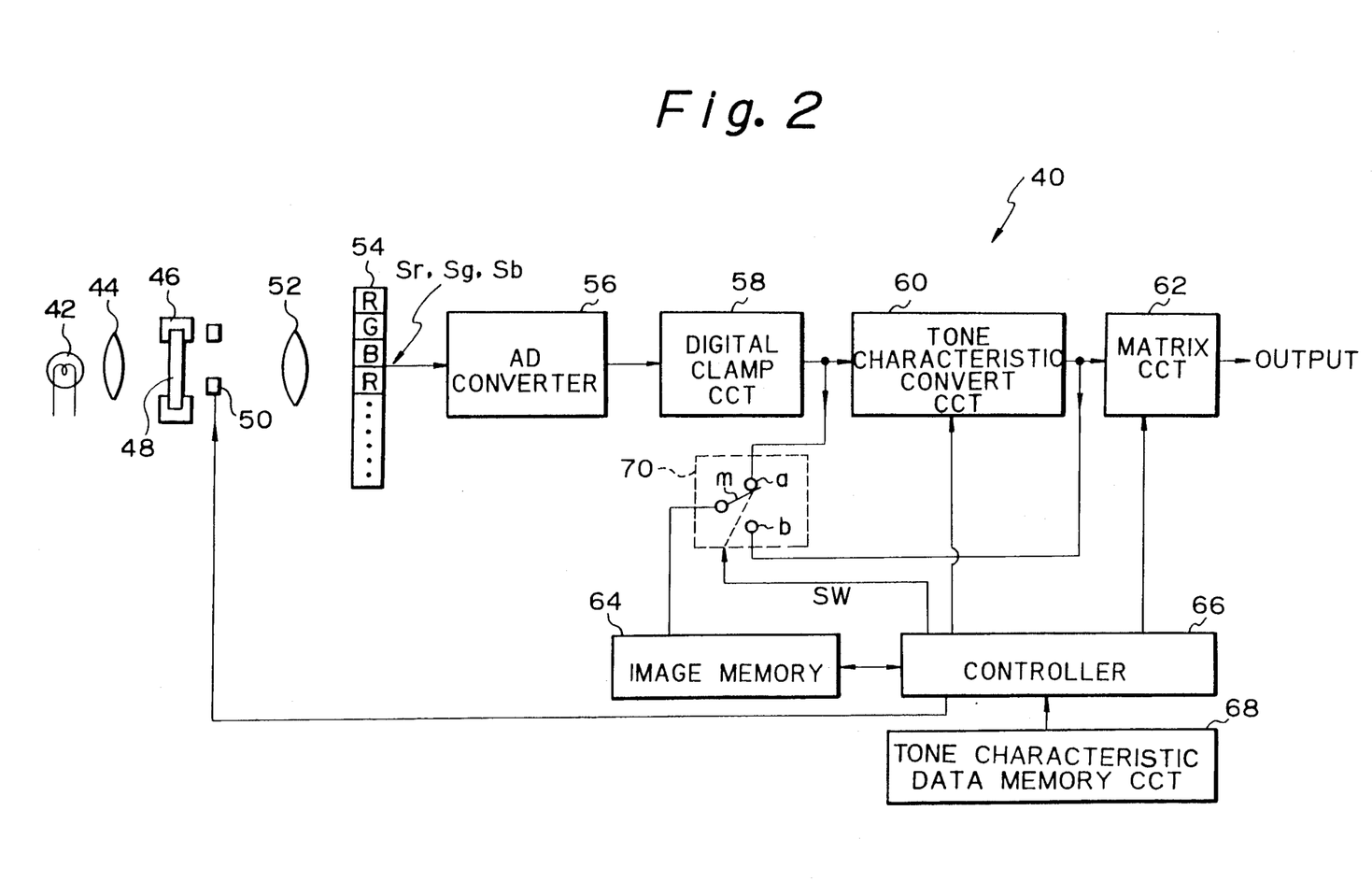
FIG. 2 is a block diagram schematically showing an image reading apparatus with which preferred embodiments of the present invention are practicable.

FIG. 2 shows an image reading apparatus 40 for practicing a first embodiment of the present invention. The apparatus 40 has a light source 42, a lens 44, a holder 46 for holding a color photographic film 48, a stop 50, and a focusing lens 52. The apparatus 40 further has a CCD line image sensor or similar photoelectric converting device 54, an AD converter 56, a digital clamping circuit 58, a tone characteristic converting circuit 60, a matrix circuit 62, an image memory 64, a controller 66, a tone characteristic data memory circuit 68, and a switch 70.

In operation, light issuing from the light source 42 is incident to the color film 48 retained by the holder 46 via the lens 44. The light transmitted through the film 48 is propagated through the stop 50 to the focusing lens 52 and thereby focused onto the CCD line image sensor 54. While effecting main scanning by itself, the line image sensor 54 is sequentially moved in the subscanning direction to generate three primary color signals Sr, Sg and Sb representative of the color image of the film 48. The color signals Sr, Sg and Sb are transformed into digital image signals by the AD converter 56 and then applied to the digital clamping circuit 58. After the digital image signals have their black level set by the clamping circuit 58, they are fed to the tone characteristic converting circuit 60 and, via a stationary contact a of the switch 70, to the image memory 64.

More specifically, the apparatus 40 prescans the film 48 whose exposing conditions are not known. During the prescanning operation, the controller 66 feeds a control signal SW to the switch 70 so as to cause a movable contact m of the switch 70 into engagement with the stationary contact a. Hence, the individual digital image signals coming out of the clamping circuit 58 are written to the image memory 64 via the stationary contact a and movable contact m of the switch 70. In this instance, the controller 66 maintains the tone characteristic converting circuit 60 inoperative. The tone characteristic data memory circuit 68 is loaded with tone characteristic data particular to a film beforehand. The control circuit 66 estimates the exposing conditions of the image of the film 48 by using the tone characteristic data of the memory circuit 68 and the individual digital color signals having been written to the image memory 64 as stated above, i.e., digital color signals Sr, Sg and Sb representative of the color image of the film 48. Based on the estimated exposing conditions and the tone characteristic data, the controller 66 selects a first set of tone characteristic conversion characteristics and a first set of color correction characteristics both of which should be applied to the individual digital image signals Sr, Sg and Sb. The first tone characteristic conversion characteristics are set in the tone characteristic converting circuit 60, while the first color correction characteristics are loaded in the matrix circuit 62. Further, the controller 66 controls the stop 50 to a particular aperture value matching the estimated exposing conditions.

Assume that the input to and output from the tone characteristic converting circuit 60 are X and Y, respectively, and that the first tone characteristic conversion characteristics each is approximated by n extremely small divisions. Then, the following equation holds:

$$Y = aij(X - Xij) + Yij \ (Xij \leq X \leq Xi+1, j) \quad (1)$$

where i is 1 to n, j is R, G or B, and aij is a constant.

Figure 3:
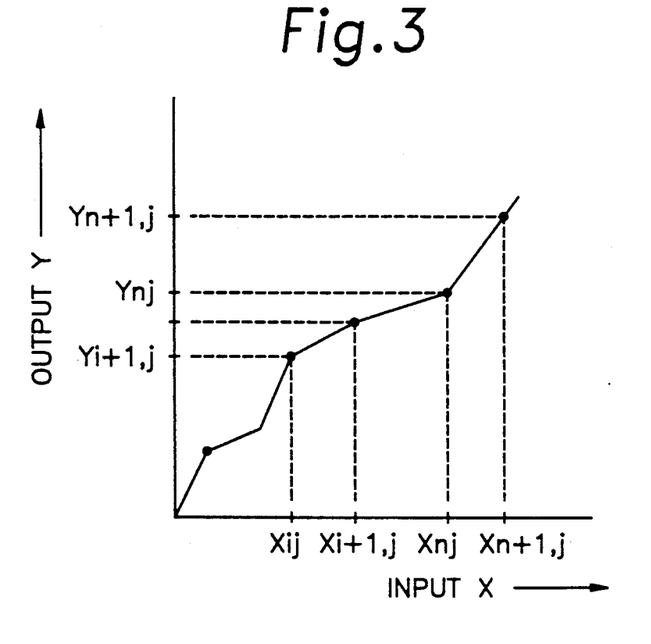
FIG. 3 is a graph representative of a specific tone conversion characteristic applicable to digital image signals.

FIG. 3 shows a specific first tone conversion characteristic applicable to a digital image signal representative of a particular color.

Subsequently, the apparatus 40 scans the color film 48 again. During this scanning, as distinguished from the prescanning, the controller 66 feeds a control signal SW to the switch 70 to cause the movable contact m into engagement with the other stationary contact b. In this condition, the digital image signals coming out of the digital clamping circuit 58 and each being associated with a particular color are fed to the tone characteristic converting circuit 60 so that their tone characteristics are converted on the basis of the first tone conversion characteristics. The individual digital color image signals with the converted tone characteristics are fed from the converting circuit 60 to the image memory 64 via the stationary contact b and movable contact m of the switch 70, thereby being written to the memory 64.

The controller 66 reads the digital image signals written to the image memory 64 as mentioned and determines the frequency distribution of their luminance component. Then, the controller 66 determines second tone conversion characteristics which provide the individual digital color components with a predetermined flat frequency distribution with respect to the luminance component. It is to be noted that the luminance component for determining the second tone conversion characteristics may be implemented by the green signal.

The second tone conversion characteristics may be produced by replacing the term Yij of the Eq. (1) with Y'ij, as shown below:

$$Y_{ij} = \alpha \frac{Y_{max} \sum_{k=0}^{Xij} D(k)}{N} + (1 - \alpha) Y_{ij} \quad \text{Eq. (2)}$$

Hence, $$Y = a'ij(X - Xij) + Y_{ij}(Xij \leq X \leq Xi+1, j) \quad (3)$$

In the above Eqs. (2) and (3), Ymax is the maximum value of the output, N is the total number of pixels, α is a constant for adjusting the fidelity of tone reproduction and lies in the range of $0 \leq \alpha \leq 1$, a'ij is a constant, and D(k) is the frequency distribution of the luminance component.

Subsequently, the controller 66 shifts the movable contact m of the switch 70 into contact with the stationary contact α by the control signal SW. As a result, the individual digital image signals whose tone characteristics have been converted on the basis of the first tone conversion characteristics are read out of the image memory 64 and fed to the tone characteristic converting circuit 60. In response, this circuit 60 again converts the tone characteristics of the digital image signals by using the second tone conversion characteristics. The resulting output of the circuit 60 is fed to the matrix circuit 62 for color correction, whereby color image signals capable of reproducing the color image with tones and colors which are visually optimal is achieved.

As stated above, when the color image of a film read by the apparatus 40 has inadequate exposing conditions as selected at the time of shooting, the apparatus 40 automatically produces color image signals whose tones are as faithful as with a color image picked up under adequate exposing conditions. In addition, the apparatus 40 reproduces tones which are well acceptable visually.

Of course, the illustrative embodiment is applicable not only to color photographic films as shown and described but also to monochromatic photographic films.

SECOND EMBODIMENT

Briefly, the second embodiment estimates the exposing conditions of the film 48, FIG. 2, in terms of the density of a non-exposed portion of the film 48 which is determined by prescanning. Based on the estimated exposing conditions, a plurality of tone characteristic data stored in the tone characteristic data memory 68, FIG. 2, are selectively read out one at a time and corrected, i.e., the tone characteristic data are not directly used. The tone characteristic converting circuit 60, FIG. 2, converts the tone characteristic of digital image signals by using the selected and corrected tone characteristic data.

Figure 4A:
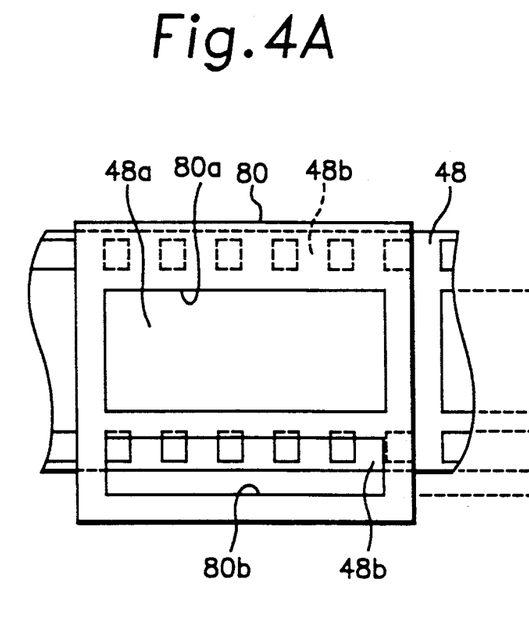
FIGS. 4A and 4B are views indicating a physical relation of a holder, a film held by the holder, and a CCD line image sensor for practicing a second embodiment of the present invention.
Figure 4B:
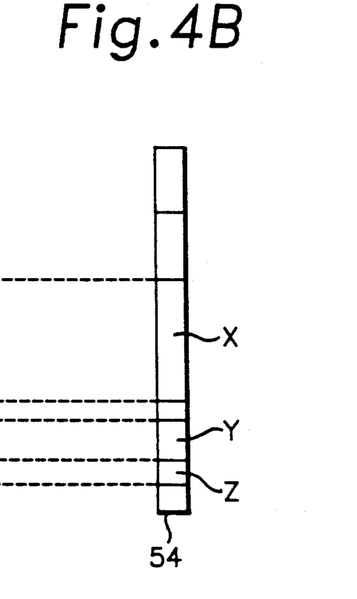
Figure 5:
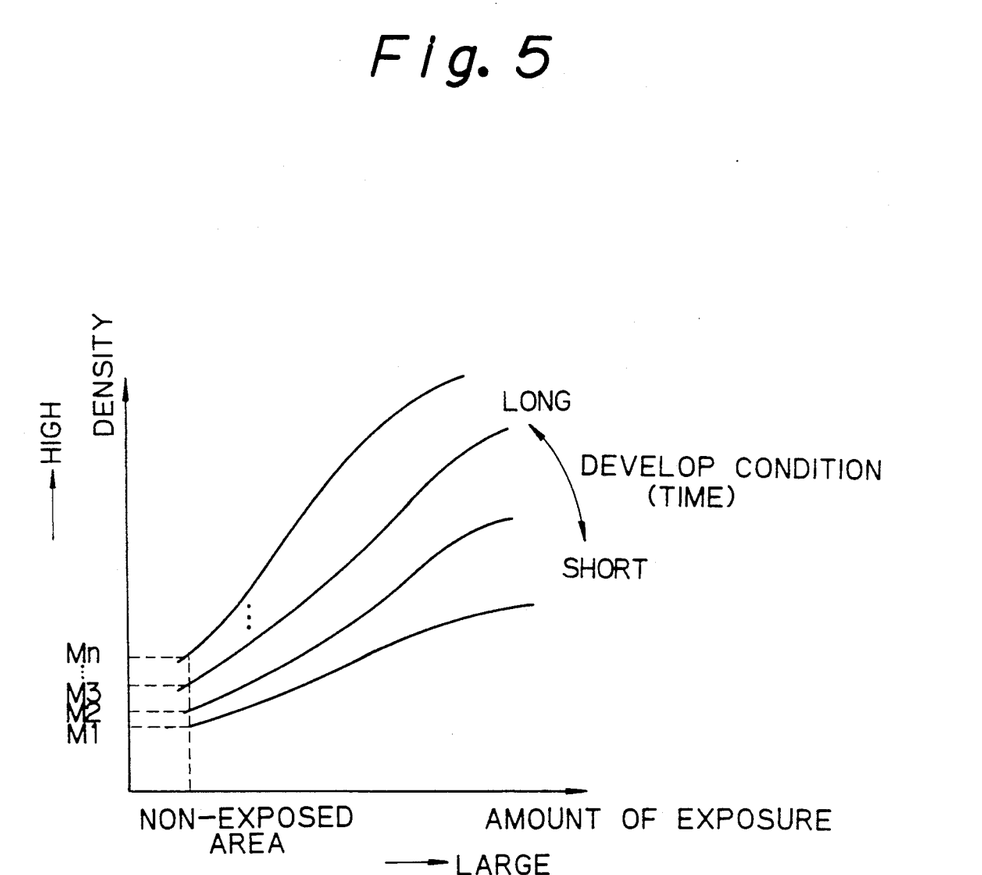
FIG. 5 is a graph representative of a specific tone characteristic group associated with developing conditions.

First, a reference will be made to FIGS. 4A and 4B for describing a film holder 80 with which this embodiment is practicable. As shown in FIG. 4A, the holder 80 loaded with the film 48 has a first opening 80a and a second opening 80b. The film 48 has an image area or exposed area 48a to be read and a non-image area or non-exposed area 48b surrounding the image area 48a, as usual. When the holder 80 is loaded with the film 48, the first opening 80a faces the image area 48a of the film 48 while the edge of the non-image area 48b is located at substantially the center of the second opening 80b. As shown in FIG. 4B, in a zoomed condition, the CCD line image sensor 54, FIG. 2, reads light transmitted through a recorded or exposed portion X which corresponds to one line of the expected image area 48a of the film 48, a non-exposed portion Y corresponding to the non-image area 48b, and a through portion Z where the film 48 does not exist. The output signals of the CCD line image sensor 54 representative of the three portions X, Y and Z are processed in synchronism. In this particular embodiment, the tone characteristic data memory circuit 38 stores tone characteristic groups (relations between the amount of exposure and film density) including exposing conditions and each being associated with a particular kind of film usable with the apparatus 40, e.g. a film available from a particular manufacturer and provided with a particular trade name. FIG. 5 shows a specific group of tone characteristics, i.e. tone characteristic data including densities M1, M2, M3, . . . , Mn as measured in the non-exposed areas.

Figure 6:
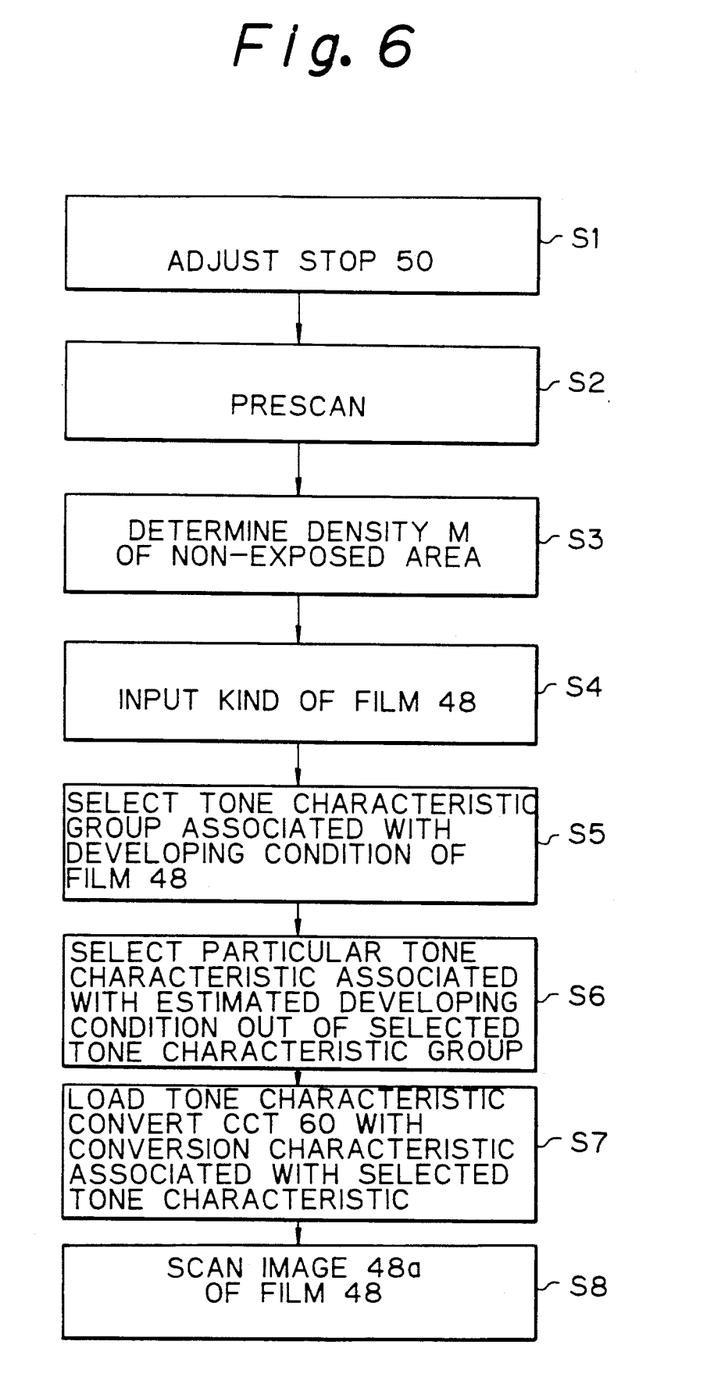
FIG. 6 is a flowchart demonstrating the operation of the second embodiment.

A reference will also be made to FIG. 6 for describing the image reading operation of the second embodiment.

To begin with, the strength of a signal associated with the through portion Z where light is not incident to the film 48 in the second opening 80b of the holder 80 is measured. This can be done with the film 48 being held on the holder 80. In response to the measured signal intensity, the stop 50 is so adjusted as to cause a predetermined quantity of light to be incident to the CCD line image sensor 54 (step S1). Such adjustment is successful in compensating for the deterioration of the light source 42 due to aging. Subsequently, the focusing lens 52 is zoomed to set up a wider reading angle than the ordinary angle for reading the image area 48a. In this condition, the entire film holder 80 is prescanned. As a result, signals associated with one line of X, Y and Z, FIG. 4B, of the film 48 are produced (step S2). The density M of the non-exposed area of the film 48 is determined in terms of the signal associated with the non-exposed portion Y (step S3). While the film 48 is usually provided with characters or similar information for management purposes (e.g. DX code) in its marginal blank areas, the controller 66, FIG. 2, processes such unnecessary information before determining the density M.

The kind of the film 48 mounted on the holder 80 is entered by a manual switch, for example (step S4). If desired, the DX code of the film 48 may be used to enter the kind of the film 48 automatically. In response to the entered kind of the film 48, a particular group of tone characteristics including developing conditions and matching the kind is read out of the tone characteristic data memory circuit 68. More specifically, the densities $m_1, m_2, m_3, \ldots, m_n$ associated with the non-exposed area are fetched as data (step S5). The controller 66 estimates the developing conditions of the film 48 on the basis of the density M of the non-exposed area as determined in the step S3. Further, based on the estimated developing conditions, the controller 55 selects a particular tone characteristic out of the tone characteristic group selected in the step S5, i.e., a tone correction characteristic having substantially an exposed area density substantially equal to the non-exposed area density M (step S6). Thereupon, the controller 66 loads the tone characteristic converting circuit 60, FIG. 2, with a conversion characteristic matching the selected tone characteristic (step S7). Finally, the lens 52 is zoomed up to regain the usual reading angle for thereby reading the exposed area 48a of the film 48 (step S8).

As described above, the illustrative embodiment selects a particular tone characteristic matching developing conditions on the basis of the tone characteristic of a particular film, thereby improving the gray balance characteristic. This accommodates a broader range of developing conditions and thereby allows films developed under various conditions to be read in a desirable manner.

Figure 7:
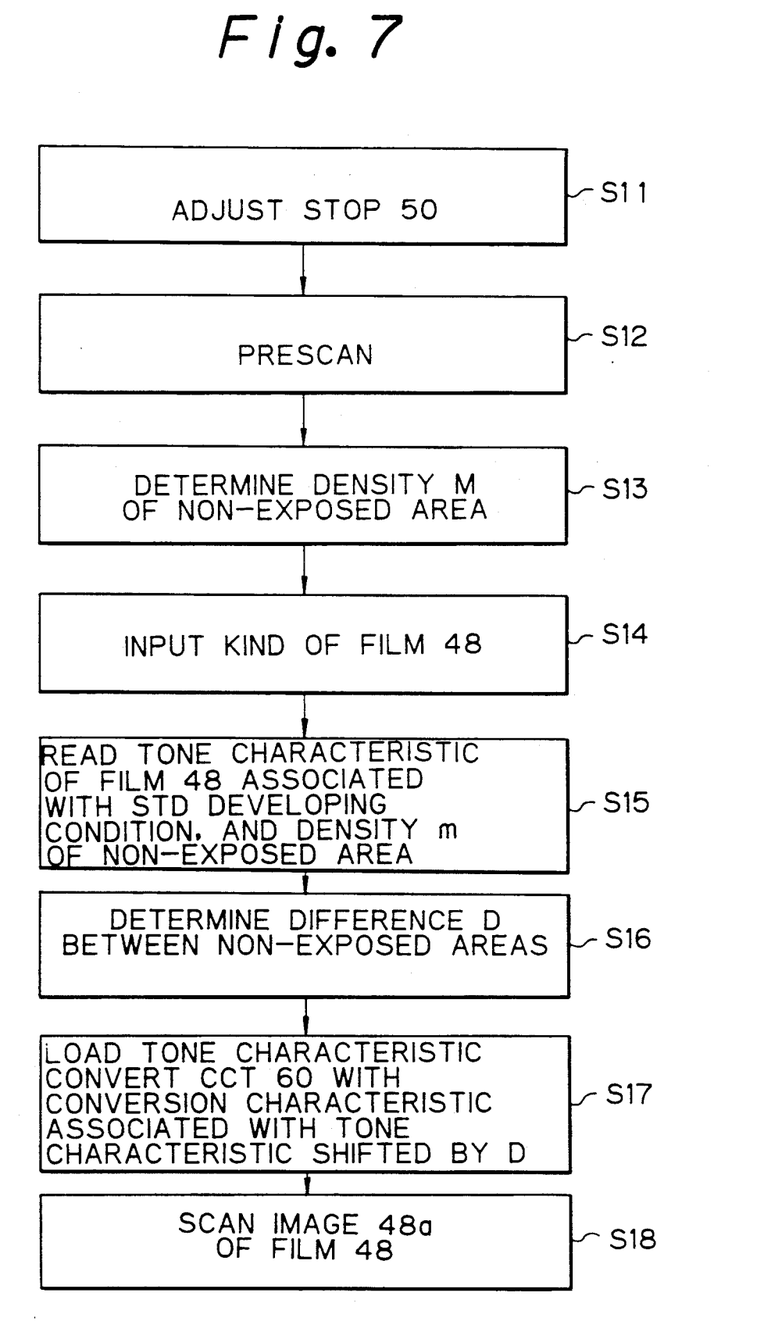
FIG. 7 is a flowchart representative of a modification of the second embodiment.
Figure 8:
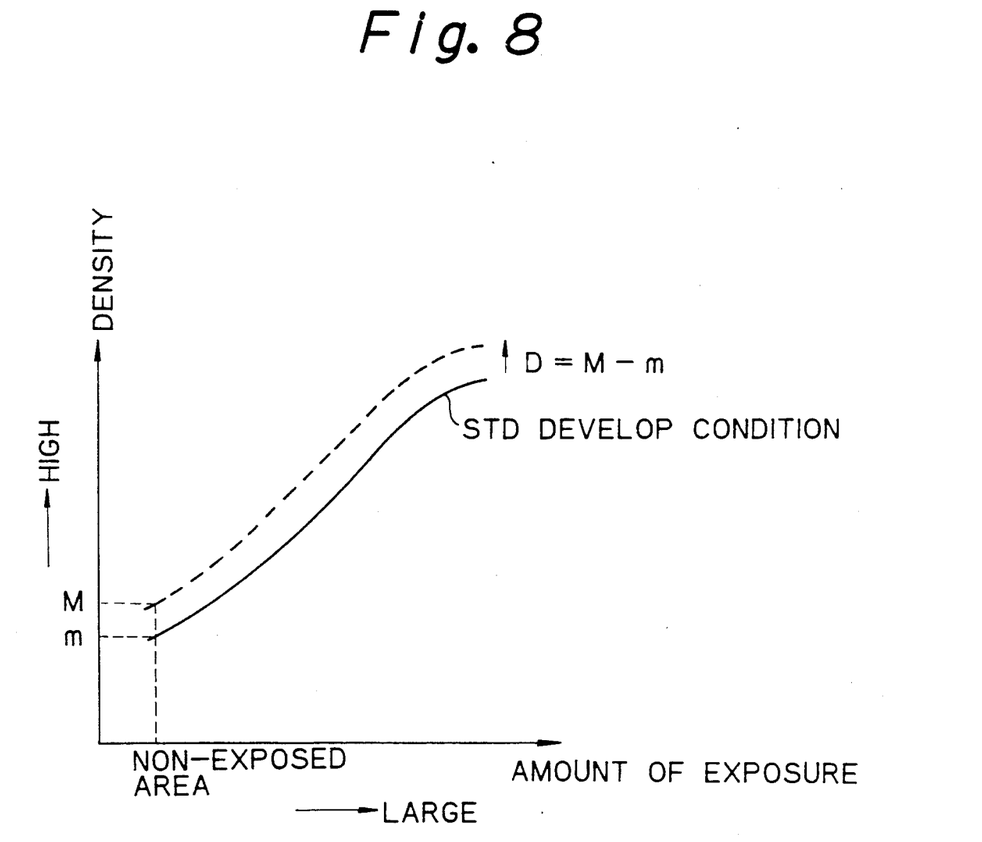
FIG. 8 is a graph showing a specific tone characteristic associated with standard developing conditions.

A modification of the second embodiment will be described with reference to FIGS. 7 and 8. The second embodiment loads the tone characteristic data memory circuit 68 with a plurality of tone characteristic groups associated with developing conditions beforehand. This requires the memory circuit 68 to have a substantial capacity. The modification which will be described loads the memory circuit 68 with only a single tone characteristic corresponding to standard developing conditions and corrects it in matching relation to particular developing conditions. In FIG. 7, steps S11 to S14 correspond respectively to the steps S1 to S4 shown in FIG. 6. Specifically, by the steps S11 to S13, the density M of the non-exposed area is determined. The kind of the film 48 mounted on the holder 80 is entered on a manual switch, for example (step S14). Then, a tone characteristic of the particular film 48 under standard developing conditions and a density m of the non-exposed area also under the standard developing conditions are read out of the tone characteristic data memory circuit 68 (step S15). As shown in FIG. 8, a difference between the detected density M and the density m read out of the memory circuit 68 is calculated, i.e., D=M−m (step S16). The tone characteristic under the standard developing conditions is bodily shifted by the difference D, as indicated by a dotted curve in FIG. 5. Then, a conversion characteristic matching the shifted or corrected tone characteristic is set in the tone characteristic converting circuit 60 (step S17). This is followed by the scanning of the film 48, as in any of the foregoing embodiments.

As stated above, the modification corrects a tone characteristic associated with standard developing conditions film by film. The gray balance, therefore, can be improved without the required capacity of the tone characteristic data memory circuit 66 being increased.

In summary, the second embodiment and the modifications thereof each estimates developing conditions of a particular film by comparing the densities of non-exposed portions, selects and corrects tone characteristic data in matching relation to the estimated developing conditions, and then converts tones. This successfully improves the gray balance characteristic and thereby insures desirable image reading.

Various modifications will become possible for those skilled in the art after receiving the teachings of the present disclosure without departing from the scope thereof.

What is claimed is:

1. A method of reading an image recorded in a photographic film to generate an image signal representative of said image, comprising the steps of:
   (a) prescanning the image of the film to generate a first image signal;
   (b) reading tone characteristic data stored beforehand and associated with the film;
   (c) estimating exposing conditions of the film selected at the time of shooting on the basis of said first image signal and said tone characteristic data;
   (d) determining a first tone conversion characteristic from said estimated exposure conditions and said tone characteristic data;
   (e) scanning the image of the film to generate a second image signal;
   (f) correcting a tone characteristic of said second image signal by said first tone conversion characteristic;
   (g) determining a frequency distribution of a luminance component of said corrected second image signal;
   (h) determining a second tone conversion characteristic by changing said first tone conversion characteristic such that said determined frequency distribution becomes a predetermined flat distribution; and
   (i) further correcting by said second tone conversion characteristic said tone characteristic of said second image signal corrected in step (f).

2. A method as claimed in claim 1, wherein step (a) comprises (j) generating an analog image signal by prescanning and thereby photoelectrically converting the image of the film, (k) converting said analog image signal into a digital image signal, and generating said first image signal by setting a black level of said digital signal.

3. A method as claimed in claim 1, further comprising (j) storing said image signal.

4. A method as claimed in claim 1, further comprising (j) storing said second image signal corrected in step (f).

5. A method of reading an image recorded in a photographic film to generate an image signal representative of said image, comprising the steps of:
   (a) prescanning the film to generate a non-exposure signal associated with a non-exposed area of said film;
   (b) determining a density of the non-exposed area of the film in response to said non-exposure signal;
   (c) storing beforehand tone characteristic groups each being associated with a particular kind of film and including a plurality of developing conditions;
   (d) inputting a kind of the film;
   (e) selecting one of said tone characteristic groups which is associated with the inputted kind of the film;
   (f) estimating developing conditions on the basis of said density determined in step (b);
   (g) selecting a particular tone characteristic out of said tone characteristic group selected in step (e) and which is associated with said estimated developing conditions; and
   (h) reading the image which is an exposed area of the film to generate an exposure signal, and then correcting a tone characteristic of said exposure signal by said tone characteristic selected in step (g) to thereby generate the image signal.

6. A method as claimed in claim 5, further comprising, prior to step (a), (i) measuring an intensity of light incident to the film.

7. A method as claimed in claim 5, wherein step (d) comprises (i) automatically inputting the kind of the film on the basis of management information which is provided in a marginal blank area of the film.

8. A method of reading an image recorded in a photographic film to generate an image signal representative of said image, comprising the steps of:
   (a) prescanning the film to generate a non-exposure signal associated with a non-exposed area of said film;
   (b) determining a density of the non-exposed area of the film in response to said non-exposure signal;
   (c) storing beforehand a tone characteristic including standard developing conditions of a plurality of kinds of films and a density of non-exposed portions of said plurality of kinds of films;
   (d) inputting a kind of the film;
   (e) reading standard developing conditions matching said inputted kind and a density of a non-exposed area of said film;
   (f) determining a difference between said density of said non-exposed area associated with said standard developing conditions and said density of said non-exposed area of the film determined in step (b);
   (g) shifting said tone characteristic associated with said standard developing conditions by said determined difference; and (h) reading the image of the film which is an exposed area to generate an exposure signal, and then correcting said tone characteristic by said shifted tone characteristic and thereby generating the image signal.

9. A method as claimed in claim 8, further comprising, prior to step (a), (i) measuring intensity of light incident to the film.

10. A method as claimed in claim 8, wherein step (d) comprises (i) automatically inputting the kind of the film on the basis of management information which is provided in a marginal blank area of the film.

* * * * *